April 21, 1936.   J. OCHSNER   2,037,999
REFUSE COLLECTING CART
Filed Jan. 2, 1934   2 Sheets-Sheet 1
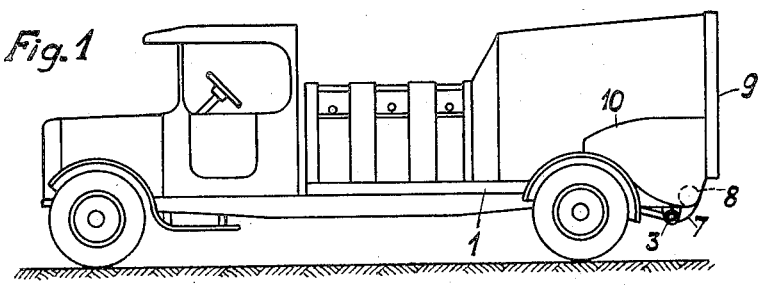
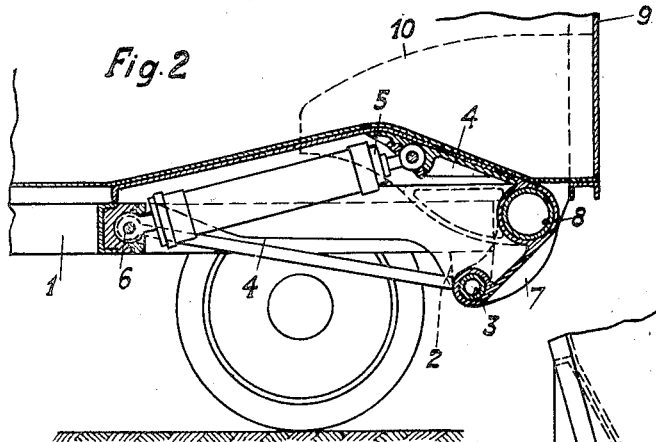
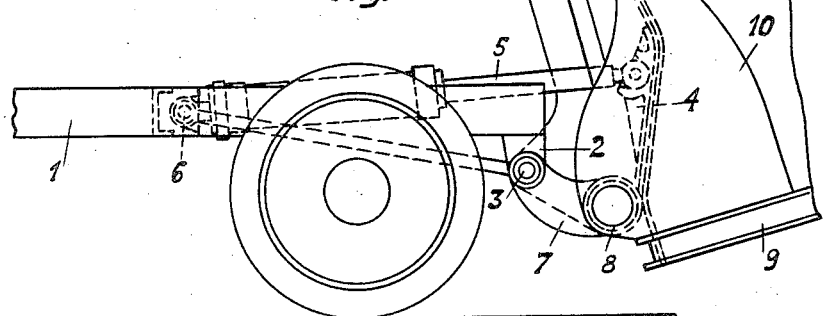
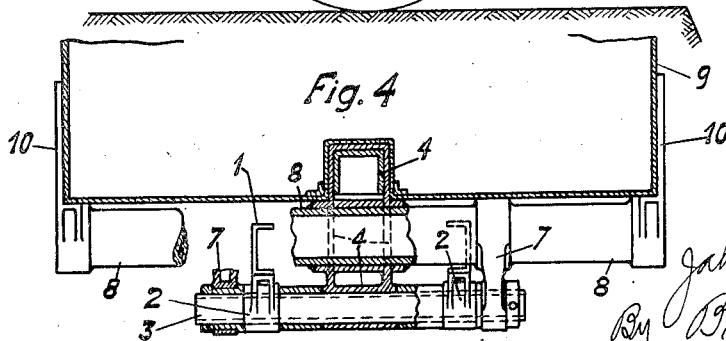

April 21, 1936.  J. OCHSNER  2,037,999
REFUSE COLLECTING CART
Filed Jan. 2, 1934   2 Sheets-Sheet 2
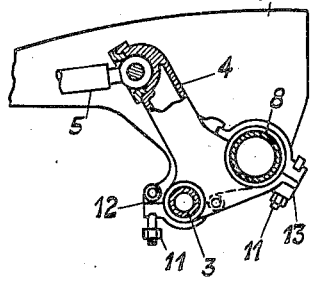
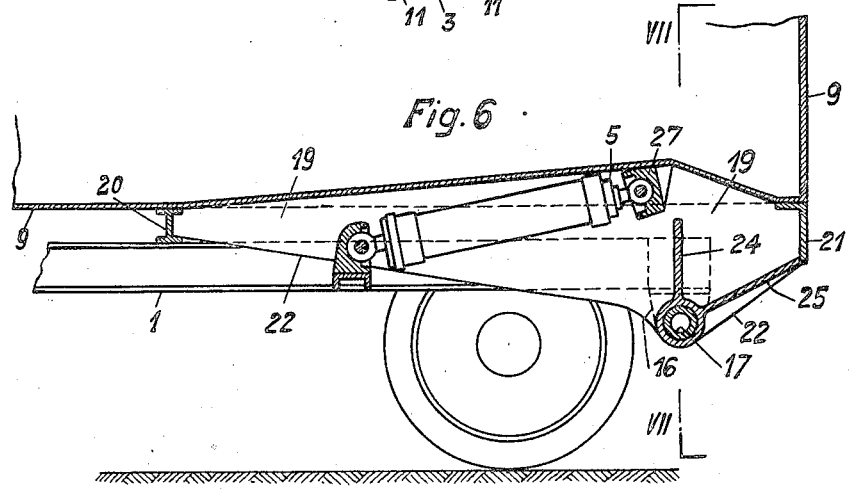
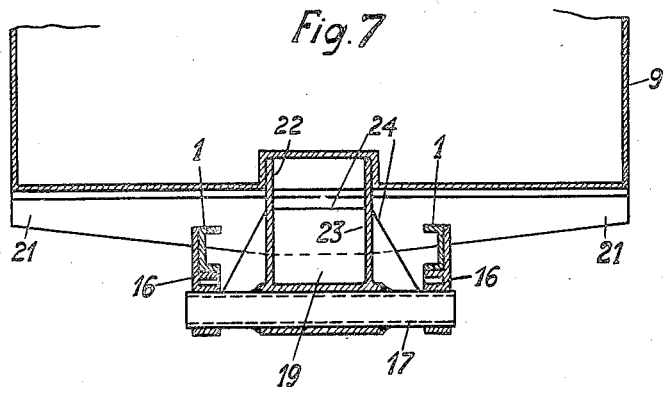

Patented Apr. 21, 1936

2,037,999

UNITED STATES PATENT OFFICE 2,037,999

REFUSE-COLLECTING CART

Jakob Ochsner, Zurich, Switzerland

Application January 2, 1934, Serial No. 705,017
In Switzerland March 3, 1933

3 Claims. (Cl. 298—22)

The invention relates to motor-driven refuse-collecting carts, and more especially to collecting carts of the kind in which the refuse container can be tipped rearwards by means of an hydraulically or pneumatically actuated piston.

The main object of the invention is to provide improved means to actuate the complete container directly by the piston. A further object of the invention is to construct the platform or the container in such a manner that it constitutes in effect a lever upon which the piston acts.

A still further object of the invention consists in the provision of a very compact structure with very effective leverage. I attain this object by placing the hydraulic or pneumatic cylinder low down in the under frame of the cart, in a horizontal or nearly horizontal position.

Other objects will appear in the course of the following description.

The invention is illustrated in the accompanying drawings, wherein

Fig. 1 shows a cart in side view, and

Fig. 2 shows part of it in section to a larger scale,

Fig. 3 shows the body of the cart in the tipped position, partly broken away.

Fig. 4 is a cross-section through the bearing, and

Fig. 5 shows in a section a modification of a detail,

Fig. 6 illustrates in sectional elevation another form of construction,

Fig. 7 being a section on the line VII—VII of Fig. 6.

Referring first to the construction shown in Figs. 1 to 4, the under frame 1 of the cart has bearings 2 for a hollow shaft 3, and a lever 4 is mounted on this shaft. This lever 4 is rotatably engaged with the rod of a piston 5 working in an hydraulic cylinder, which is pivoted to a cross member 6 of the under frame and normally occupies the nearly horizontal position shown in Fig. 2. The shaft 3 has two arms 7 carrying a steel tube 8 extending through the lever 4 and welded to the same. The refuse container 9 is fixed to the tube 8 by means of plates 10, the latter being rigidly fixed to the side walls and to the frame of the container say by riveting or otherwise.

By the outward stroke of the piston from the position shown in Fig. 2 the lever 4 is rocked upwards and tips the container 9, the arms 7 and tube 8 being rocked downwards about the axis of the shaft 3. The parts 3, 4, 6, 7, 8, 9, 10 constitute a rigid structure, actuated directly by the piston. The shaft 3 is so positioned in relation to the cylinder that the leverage through which the piston operates is favourable from the start and continues so till the container has been fully tipped (Fig. 3). The container is restored to normal position by gravity, assisted by the piston, which is double-acting.

Fig. 5 illustrates a modification of the composite lever. Bolts 11 secure the bearings 12 and 13 of the lever 4 and plates 10, so that the container 9 can be removed from the under frame when the bolts 11 are unfastened.

Figs. 6 and 7 illustrate a modification in which the underframe 1 has bearings 16 for a shaft 17, and this shaft has fixed thereto a composite lever 19 consisting of beams 20, 21 arms 22, 23 and reinforcements 24, 25. The container 9 is fixed to this lever by riveting and the piston rod 5 pivotally engages the lever 19 at a bearing 27.

What I claim is:—

1. In a dumping vehicle, a wheeled underframe having depending bearings at its rear end, a tiltable load carrying element having depending members at its rear end, a pivotal shaft in said bearings arranged to receive said depending members, a lever under said tiltable element and mounted on said pivotal shaft and fluid pressure actuated means to tilt said tiltable element and comprising a cylinder pivotally connected to said underframe and a piston element pivotally connected to said lever, the points of pivotal connection between said cylinder and piston element respectively to said underframe and lever being at points above the level of said pivotal shaft, said depending members and said lever being rigidly secured to said tiltable element.

2. In a dumping vehicle, a wheeled underframe having depending bearings at its rear end, a tiltable load carrying element having depending members at its rear end, a pivotal shaft in said bearings arranged to receive said depending members, a lever under said tiltable element and mounted on said pivotal shaft, a traverse member extending parallel to said pivotal shaft and to which said lever and said depending members are fixedly secured, and fluid pressure actuated means to tilt said tiltable element and comprising a cylinder pivotally connected to said underframe and a piston element pivotally connected to said lever, the points of pivotal connection between said cylinder and piston element respectively to said underframe and lever being at points above the level of said pivotal shaft.

3. In a dumping vehicle, a wheeled underframe having depending bearings at its rear end, a tiltable load carrying element having depending members at its rear end, a pivotal shaft in said bearings arranged to receive said depending members, a lever under said tiltable element and mounted on said pivotal shaft, a traverse member connecting said depending members with each other and passing through said lever between the ends thereof, and fluid pressure actuated means to tilt said tiltable element and comprising a cylinder pivotally connected to said underframe and a piston element pivotally connected to said lever, the points of pivotal connection between said cylinder and piston element respectively to said underframe and lever being at points above the level of said pivotal shaft.

JAKOB OCHSNER.